US012592246B2

(12) United States Patent
Can et al.

(10) Patent No.: US 12,592,246 B2
(45) Date of Patent: Mar. 31, 2026

(54) SYSTEM AND METHOD FOR EXTRACTING HIDDEN CUES IN INTERACTIVE COMMUNICATIONS

(71) Applicant: Capital One Services, LLC, McLean, VA (US)

(72) Inventors: Aysu Ezen Can, Cary, NC (US); Jan Amtrup, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 288 days.

(21) Appl. No.: 17/698,029

(22) Filed: Mar. 18, 2022

(65) Prior Publication Data

US 2023/0298615 A1      Sep. 21, 2023

(51) Int. Cl.
| | |
|---|---|
| *G10L 25/63* | (2013.01) |
| *G06F 40/279* | (2020.01) |
| *G06F 40/30* | (2020.01) |
| *G06N 5/04* | (2023.01) |
| *G10L 15/18* | (2013.01) |
(Continued)

(52) U.S. Cl.
CPC ............ *G10L 25/63* (2013.01); *G06F 40/279* (2020.01); *G06F 40/30* (2020.01); *G06N 5/04* (2013.01); *G10L 15/1807* (2013.01); *G10L 15/1815* (2013.01); *G10L 15/26* (2013.01); *G10L 25/03* (2013.01)

(58) Field of Classification Search
CPC . G10L 25/63; G10L 15/1807; G10L 15/1815; G10L 15/26; G10L 25/03; G06F 40/279;

G06F 40/30; G06F 40/103; G06F 40/106; G06F 40/216; G06F 40/284; G06F 16/345; G06N 5/04; G06N 3/045; G06N 3/08; G06N 20/00

See application file for complete search history.

(56) References Cited

U.S. PATENT DOCUMENTS

| | | | |
|---|---|---|---|
| 8,411,841 B2 | 4/2013 | Edwards et al. | |
| 9,124,697 B2 | 9/2015 | Scott et al. | |
| 9,160,852 B2 | 10/2015 | Ripa et al. | |
(Continued)

OTHER PUBLICATIONS

Kafle, Sushant, Cecilia O. Alm, and Matt Huenerfauth. "Modeling Acoustic-Prosodic Cues for Word Importance Prediction in Spoken Dialogues." arXiv preprint arXiv:1903.12238 (2019); 9 pages.
Ostendorf, Mari, Izhak Shafranp, and Rebecca Bates. "Prosody models for conversational speech recognition." (2003); 8 pages.
(Continued)

*Primary Examiner* — Michael N Opsasnick
(74) *Attorney, Agent, or Firm* — Sterne, Kessler, Goldstein & Fox P.L.L.C.

(57) ABSTRACT

Disclosed herein are system, method, and computer program product embodiments for machine learning systems to process interactive communications between at least two participants. Speech and text, within the interactive communications, are analyzed using machine learning classifiers to extract prosodic, semantic and key phrase cues located within the interactive communications to identify changes to emotion, sentiments and key phrases. A summary of the interactive communications between a first participant and a second participant is generated at least, in-part, based on the extracted prosodic, semantic and key phrase cues and the summary is highlighted based on any of the changes to emotion, the sentiments or the key phrases.

20 Claims, 9 Drawing Sheets

200

(51) Int. Cl.
  *G10L 15/26*      (2006.01)
  *G10L 25/03*      (2013.01)

(56) References Cited

U.S. PATENT DOCUMENTS

| | | | |
|---|---|---|---|
| 9,900,436 | B2 | 2/2018 | Raanani et al. |
| 10,171,659 | B2 | 1/2019 | Riahi et al. |
| 10,645,224 | B2 | 5/2020 | Dwyer et al. |
| 10,972,611 | B2 | 4/2021 | Feast et al. |
| 11,070,673 | B1 | 7/2021 | Lemus et al. |
| 11,115,530 | B1 | 9/2021 | Andar et al. |
| 2005/0100159 | A1 | 5/2005 | Fink et al. |
| 2013/0262096 | A1* | 10/2013 | Wilhelms-Tricarico ..................... G10L 13/04 704/207 |
| 2015/0379429 | A1* | 12/2015 | Lee .......................... G09B 5/00 706/11 |
| 2016/0004911 | A1* | 1/2016 | Cheng .................. H04N 21/233 382/159 |
| 2016/0350699 | A1* | 12/2016 | Vymenets ...... G06Q 10/063118 |
| 2017/0180495 | A1* | 6/2017 | Comstock .............. H04L 67/02 |
| 2017/0206891 | A1* | 7/2017 | Lev-Tov .............. G10L 15/063 |
| 2017/0372323 | A1* | 12/2017 | Stern ................... H04M 3/5235 |
| 2018/0075483 | A1* | 3/2018 | Boyarshinov ...... G06Q 30/0255 |
| 2019/0050875 | A1* | 2/2019 | McCord ................ G06F 40/242 |
| 2019/0340296 | A1* | 11/2019 | Cunico ................... G06F 16/38 |
| 2020/0105274 | A1* | 4/2020 | Joller .................... G06F 16/638 |
| 2021/0004836 | A1 | 1/2021 | Adibi et al. |
| 2022/0093101 | A1* | 3/2022 | Krishnan ............... G10L 15/24 |

OTHER PUBLICATIONS

Liu, Yang, Elizabeth Shriberg, and Andreas Stolcke. "Automatic disfluency identification in conversational speech using multiple knowledge sources." Eighth European Conference on Speech Communication and Technology. 2003; 4 pages.

Tran, Trang, et al. "Parsing speech: a neural approach to integrating lexical and acoustic-prosodic information." arXiv preprint arXiv:1704. 07287 (2017); 13 pages.

Priyadarshana, Y. H. P. P., et al. "Sentiment analysis: Measuring sentiment strength of call centre conversations." 2015 IEEE International Conference on Electrical, Computer and Communication Technologies (ICECCT). IEEE, 2015; 7 pages.

Powar, Swati, et al. "Call Center Sentiment Analysis." International Engineering Journal For Research & Development 5.5 (2020): 7-7; 7 pages.

Ezzat, Souraya, Neamat El Gayar, and Moustafa M. Ghanem. "Sentiment analysis of call centre audio conversations using text classification." International Journal of Computer Information Systems and Industrial Management Applications 4.1 (2012): 619-627; 9 pages.

Turney, Peter D. "Learning algorithms for keyphrase extraction." Information retrieval 2.4 (2000): 303-336; 46 pages.

Zha, Hongyuan. "Generic summarization and keyphrase extraction using mutual reinforcement principle and sentence clustering." Proceedings of the 25th annual international ACM SIGIR conference on Research and development in information retrieval. 2002; 8 pages.

Berend, Gábor. "Opinion expression mining by exploiting keyphrase extraction." (2011): 1162-1170; 9 pages.

* cited by examiner

300

Natural Language Processor
302

Interface

304

Semantic Analyzer

306

MMDS

308

Interpreter

310

Actuator

Figure 7:
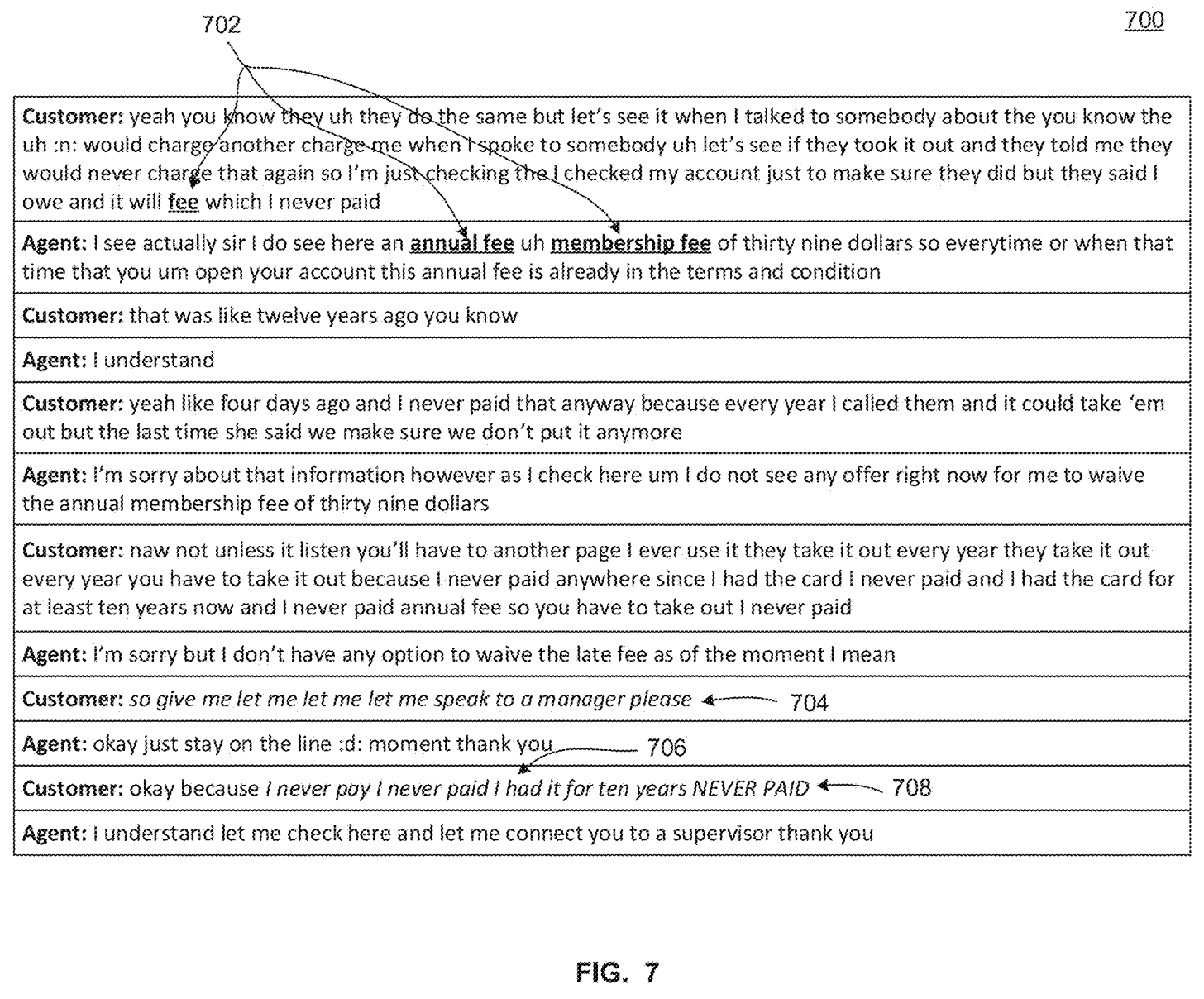

Customer: yeah you know they uh they do the same but let's see it when I talked to somebody about the you know the uh :n: would charge another charge me when I spoke to somebody uh let's see if they took it out and they told me they would never charge that again so I'm just checking the I checked my account just to make sure they did but they said I owe and it will fee which I never paid

Agent: I see actually sir I do see here an annual fee uh membership fee of thirty nine dollars so everytime or when that time that you um open your account this annual fee is already in the terms and condition

Customer: that was like twelve years ago you know

Agent: I understand

Customer: yeah like four days ago and I never paid that anyway because every year I called them and it could take 'em out but the last time she said we make sure we don't put it anymore

Agent: I'm sorry about that information however as I check here um I do not see any offer right now for me to waive the annual membership fee of thirty nine dollars

Customer: naw not unless it listen you'll have to another page I ever use it they take it out every year they take it out every year you have to take it out because I never paid anywhere since I had the card I never paid and I had the card for at least ten years now and I never paid annual fee so you have to take out I never paid

Agent: I'm sorry but I don't have any option to waive the late fee as of the moment I mean

Customer: *so give me let me let me let me speak to a manager please* ◄——— 704

Agent: okay just stay on the line :d: moment thank you ——— 706

Customer: okay because *I never pay I never paid I had it for ten years NEVER PAID* ◄——— 708

Agent: I understand let me check here and let me connect you to a supervisor thank you

SYSTEM AND METHOD FOR EXTRACTING HIDDEN CUES IN INTERACTIVE COMMUNICATIONS

BACKGROUND

Text and speech may be analyzed by computers to discover words and sentences. However, missing in current computer-based text/speech analyzers is an ability to properly recognize tone, changes in tone, underlying emotions, emotional states, emotional trends or specific emphasis of the writer or speaker. For example, text or emails communicated to another person leave recognition of tone to the receiver. However, the receiver may misinterpret the intended tone/emotion based on his or her own experiences or current emotional state. As a consequence, they may assign an unintended meaning to the communication.

BRIEF DESCRIPTION OF THE DRAWINGS

The accompanying drawings are incorporated herein and form a part of the specification.

FIG. 3 is a block diagram for natural language processing of an incoming call, according to some embodiments.

FIG. 7 is an example of highlighted extracted cues within an interactive communication, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
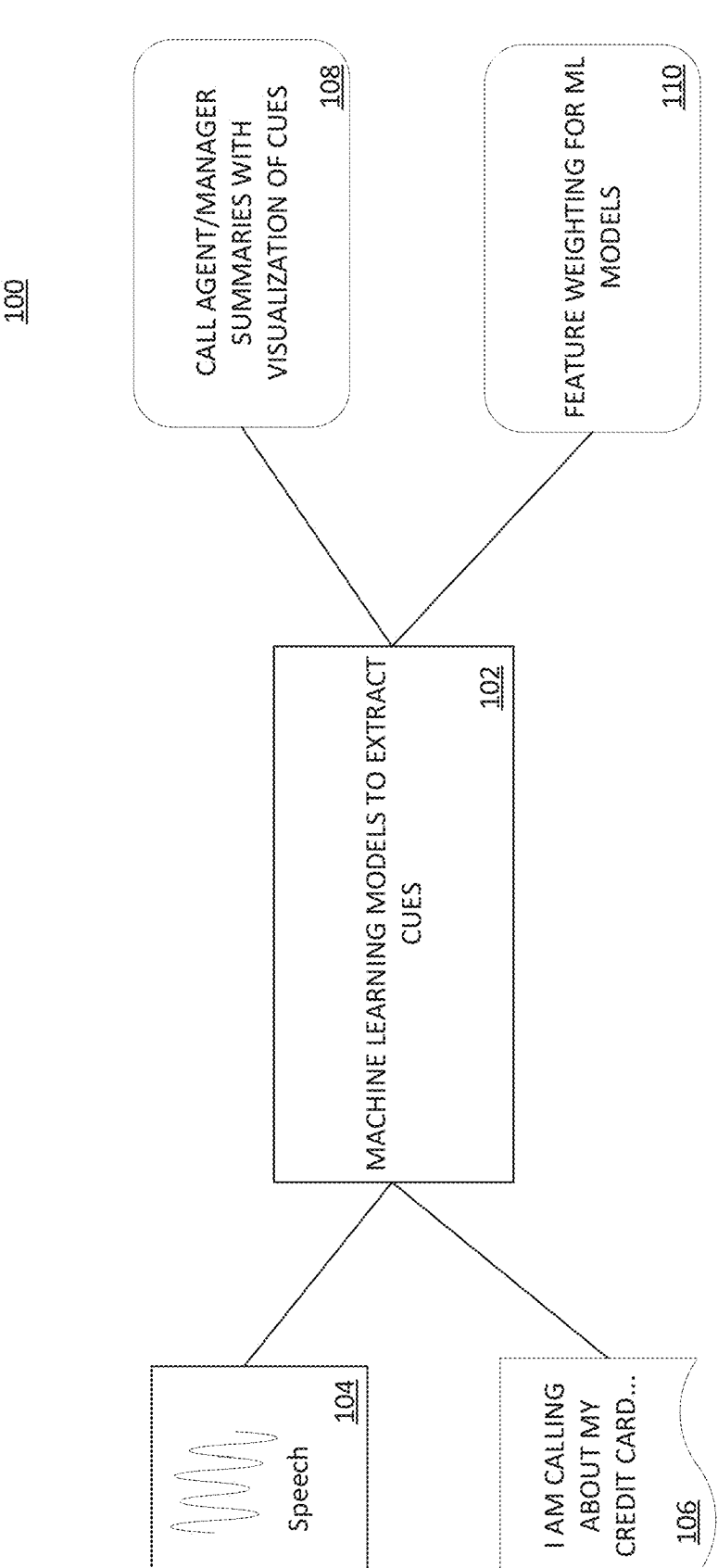
FIG. 1 is a block diagram for extracting cues from an interactive communication, according to some embodiments.

Provided herein are system, apparatus, device, method and/or computer program product embodiments, and/or combinations and sub-combinations thereof to extract cues located within interactive communications.

In some embodiments, the technology disclosed herein provides a framework that utilizes machine learning (ML) models to extract cues from caller-call agent interactions. These cues may include prosodic cues, such as when a customer raises their voice, semantic cues, including sentiments of the words, as well as linguistic cues, such as detecting key phrases indicative of subject matter. In one non-limiting example, vocalized stress on certain words may indicate a higher emphasis on these words. In another non-limiting example, an increase in volume or pitch may indicate a change in emotions and an inclination towards anger/frustration. In some embodiments, these extracted cues may be able to paint a more complete picture of a customer's experience during a call to a call center that may be used to increase overall customer satisfaction. In some embodiments, highlighted summaries may be provided to downstream users, including call agents/managers in the call centers as well as to machine learning models built in pipelines of modeling customer conversations.

Customer call centers lie at the heart of customer-company communications and it is important to build a good relationship with customers to be able to increase customer satisfaction and business. To that end, gaining insight into call center communications may provide a platform for improving these experiences. These insights may be extracted using many modalities, including speech, text and images. For example, in some embodiments, a call center may be provided a platform for detecting when a customer gets frustrated using prosodic or semantic cues. These insights may be useful for call agents/managers who are on the call where information may be limited, ultimately affecting customer satisfaction.

Real-time assistance is key to providing the best support to agents. In various embodiments, assistance is provided while a call is in progress in order to improve customer interaction in real time. In some embodiments, assistance is provided post call for call agent training or to enhance repeat customer calls. For example, during a previous call, a cue reflecting anger was extracted. This information may prove useful for a call agent to understand the customer's previous emotional state when receiving a follow-up call by the same caller.

In some embodiments, the technology described herein implements a plurality of machine learning models related to customer experience combined in an infrastructure to support call center agents in real-time while interacting with customers.

In some embodiments, the technology described herein provides processing of incoming call-center calls based on inferred (machine learning model) sentiments. The call is recorded, optionally punctuated and classified based on one or more inferred sentiments of a current caller's dialog.

The technology described herein improves the technology associated with handling calls by, at a minimum, properly extracting caller sentiment and subsequently detected sentiment trends and call solutions. Properly captured sentiment, as described herein, is one element leading to higher correlated solutions. As such, the technology described herein improves how a computer identifies a caller's sentiment, thereby improving the operation of the computer system itself.

In some embodiments, the technology described herein provides processing of incoming call-center calls based on inferred (machine learning model) prosodic cues. The call is recorded and classified based on one or more inferred prosodic cues, such as changes to frequency or pitch, pauses, length of sounds, volume (e.g., loudness), speech rate, voice quality or stress placed on a specific utterance of the speech of the caller. The technology described herein improves the technology associated with handling calls by, at a minimum, properly extracting caller prosodic cues. Properly captured prosodic cues, as described herein, is one element leading to higher correlated solutions. As such, the technology described herein improves how a computer identifies a caller's prosodic cues, thereby improving the operation of the computer system itself.

In some embodiments, the technology described herein provides processing of incoming call-center calls based on inferred (machine learning model) key phrases. The call is recorded, optionally punctuated and classified based on one or more inferred key phrases, such as phrases referring to subject matter, theme or reason for the call. The technology described herein improves the technology associated with handling calls by, at a minimum, properly extracting caller key phrases. Properly captured key phrases, as described herein, is one element leading to higher correlated solutions. As such, the technology described herein improves how a computer identifies a caller's key phrases, thereby improving the operation of the computer system itself.

In some embodiments, the cues will be visualized to assist call agents or managers to facilitate their work (e.g., repeat calls with same customer, training opportunities) and to save time. In some embodiments, the hidden cues will be used for downstream machine learning models to increase the models' effectiveness in understanding customer behavior.

FIG. 1 is a block diagram for extracting cues from an interactive communication, according to some embodiments. The cues may be considered, in some embodiments, to be hidden or not explicitly revealed. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example call flow from incoming call to call summaries. Greater detail will be provided in the figures that follow.

Figure 3:
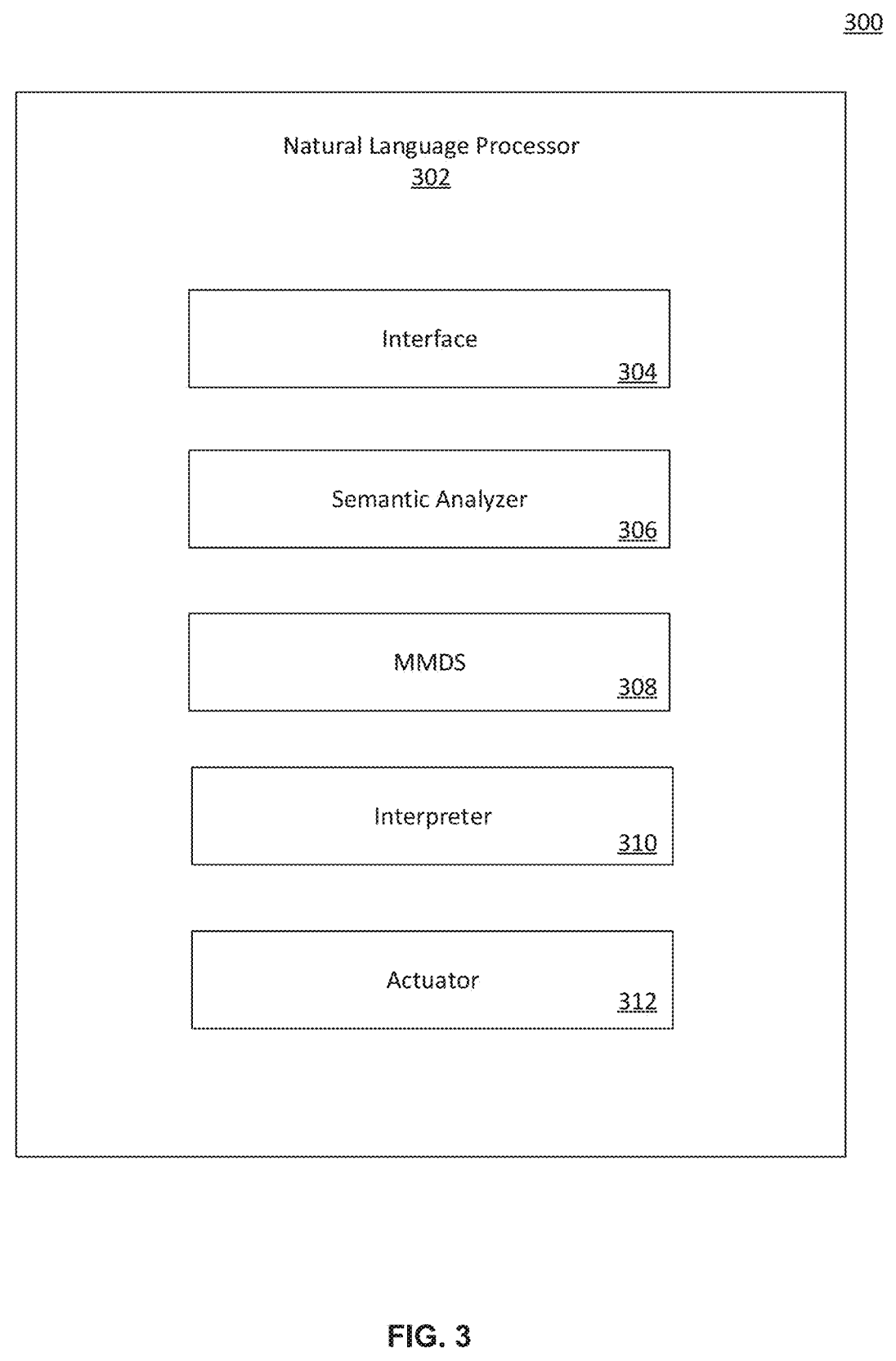

As shown, speech 104 from an incoming call may be analyzed by a natural language processor (NLP), as described in greater detail in FIG. 3. The natural language processor may break down a series of utterances to determine the "parts" of speech occurring during the interactive communication (call). Machine learning models 102 receive the analyzed speech to extract conversational cues. These cues include, but are not limited to, volume, pitch, rate, pauses, stress, sentiment, emotions, etc.

Text, such as a transcript 106 of a call, may also be analyzed by a natural language processor (NLP) as described in greater detail in FIG. 3. The natural language processor will break down the script into a series of words or sentences and reveal their semantic structure. Machine learning models 102 may receive the analyzed script to extract conversational cues, such as, key words, potential subjects, themes or sentiment cues.

An output of system 100 may include a textual summary of the call with visualization 108 of extracted cues. In a non-limiting example, visualization may include highlighting with color, fonts, capitalization, or combinations thereof. These summaries may be provided to call agents or call center managers for quick reading, either during a call, for a next call by a same caller to quickly get up to speed on the last interaction or for training purposes. For example, it is much easier to browse through the content of a transcription with the cues visualized.

In a non-limiting example, a first version of a conversation is provided below from a script of the call, while a second version provides visualization of extracted cues from the same conversation. The second version provides a quick understanding for the reader of the conversation. The longer the conversation, the ability to shorten reading time becomes more valuable to a call agent, for example, for a follow-up call from the same caller.

Version 1:
    Caller: this is the third time I am calling about this
    Agent: I understand. I apologize that your issue could not be resolved until now.
    Caller: I just don't understand how just how can this card stop working
    Agent: I can see that there is a chip malfunction in some of our cards and yours is one of them Version 2:
    Caller: this is the THIRD time I am calling about this
    Agent: I understand. I apologize that your issue could not be resolved until now.
    Caller: I just don't understand HOW JUST HOW can this card stop working
    Agent: I can see that there is a chip malfunction in some of our cards and yours is one of them When the reader of the second version is attempting a quick read to understand the situation, they only need to focus on the enhanced (highlighted) words (THIRD' and 'HOW JUST HOW') and the underlined words 'card stop working' and 'chip malfunction'. It is possible to understand quickly that the customer is having a problem with their credit card which used to work and they called three times to resolve this problem.

In some embodiments, the cues may be used for downstream ML models to increase the models' effectiveness in understanding customer behavior. For example, the cues may be used for weighting of related call center ML models 110, such as using sentiment cues as weighted features for a ML model to determine if a customer is calling about a complaint. Continuing the example, words or phrases frequently found to be associated with a raised voice or quickened conversation pace may be highly weighted to determine emotions of a customer in the ML models.

Figure 2:
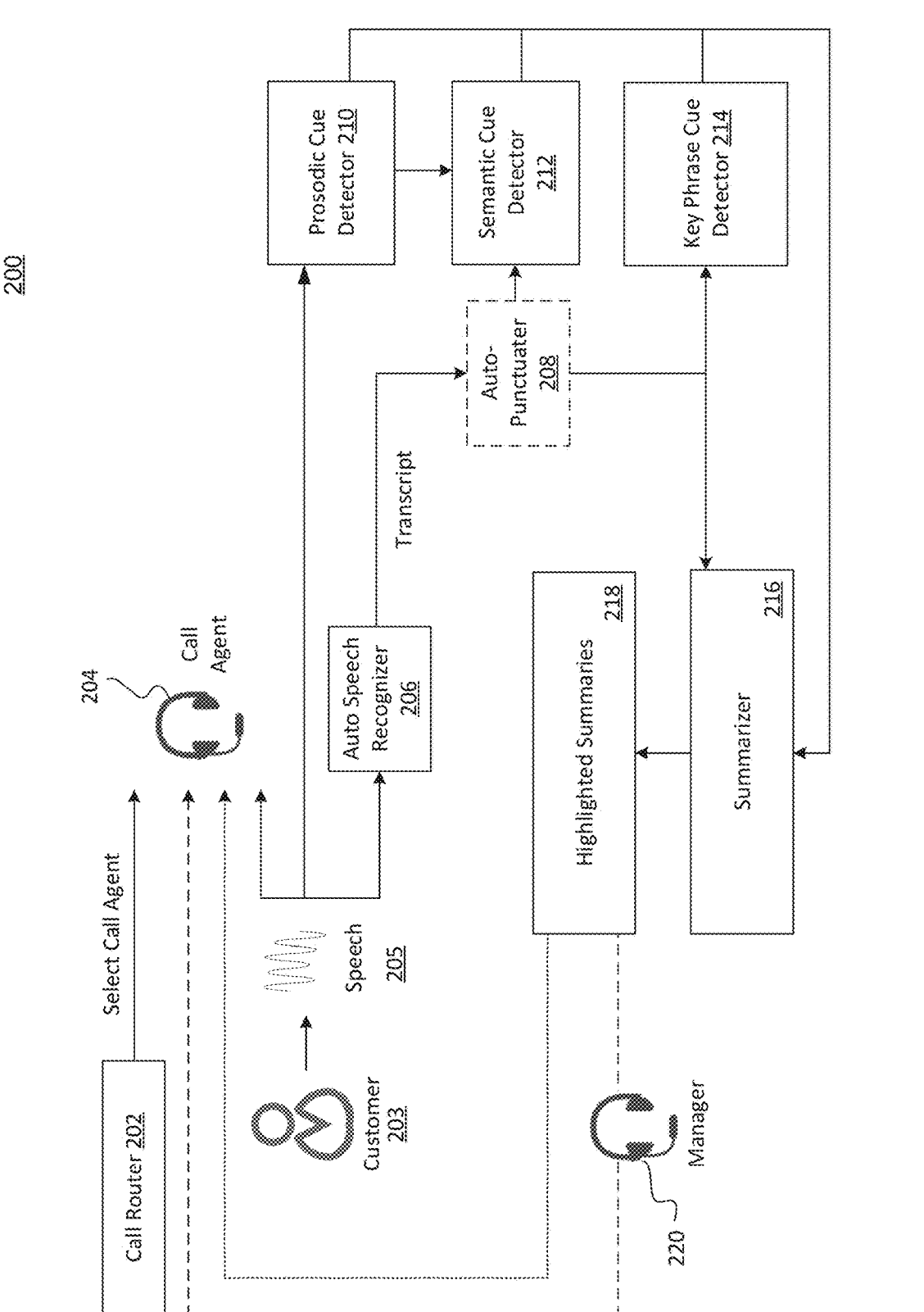
FIG. 2 is a flow diagram for a call center system processing an incoming call, according to some embodiments.

FIG. 2 illustrates an example call center system 200 processing an incoming interactive communication such as a customer 203 call, as per some embodiments. System 200 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 2, as will be understood by a person of ordinary skill in the art.

System 200 shall be described with reference to FIG. 2. However, system 200 is not limited to this example embodiment. In addition, system 200 will be described at a high level to provide an overall understanding of one example call flow from incoming call to call agent assistance. Greater detail will be provided in the figures that follow.

Call center calls are routed to a call agent 204 through a call router 202. Call router 202 may analyze pre-call information, such as a caller's profile, previous call interactions, voice menu selections or inputs to automated voice prompts. Call agents may be segmented into groups by subject matter expertise, such as experience with specific subjects or subject matter customer complaints. Understanding which call agent to route the incoming call to may ultimately determine a successful outcome, reduce call time and enhance a customer's experience. In an embodiment, the call agent may be a chatbot(s) or other equivalent, communication entity.

Once a call agent 204 is selected, automatic speech recognition (ASR) engine may analyze the incoming caller's speech 205 in real time by sequentially analyzing utterances. Utterances may include a spoken word, statement, or vocal sound. However, utterances may be difficult to analyze without a proper understanding of how, for example, one utterance relates to another utterance. Languages follow known constructs (e.g., semantics), patterns, rules and structures as is known. Therefore, these utterances may be analyzed using a systematic approach as will be discussed in greater detail hereafter.

Call centers receive hundreds of thousands of calls daily. These calls may be transcribed from speech recordings to text using automatic speech recognition engine (ASR) 206. The ASR system's output is a sequence of words that begin when the caller begins speaking (e.g., utterances) and ends only once there is a significant duration of silence or the call ends. This text may therefore contain many sentences with no visible boundaries between them and no punctuation. Additionally, given the spontaneous nature of spoken language, the text frequently contains disfluencies, for example, filler words, false starts, incomplete phrases, and other hallmarks of unrehearsed speech. These disfluencies are not marked, and are interleaved with the rest of the speech. This further obscures the meaningful portions of the text. The lack of punctuation and boundaries in the ASR system's output causes difficulty for humans or computers analyzing, reading, or processing the text output, and causes problems for downstream models, which benefit from clearly delineated syntactic boundaries in the text. One way to increase an understanding of utterances is to aggregate one or more utterances into related structures (segments). In some embodiments, ASR may convert call audio to text for the downstream analyses described in the following sections.

Optional auto-punctuator 208 may, in some embodiments, add punctuation to segments of utterances, thus grouping them into sentences, partial sentences or phrases. For example, the sequential utterances " . . . problem with my credit card . . . " may have two different meanings based on punctuation. In the first scenario, punctuation after the word credit ("problem with my credit. Card . . . ") would indicate a credit issue. In a second scenario, punctuation after the word card ("problem with my credit card") would indicate a credit card issue. Therefore, intelligent punctuation may suggest to the system contextual relevancy needed to properly address caller issues.

Continuing with the example, in one embodiment, assuming that the input into the system 200 is a customer's speech 205 to be converted to text, the system 200 may begin performing its functions by generating text strings to obtain a representation of the meaning of each word in the context of the speech string. The text string refers to a sequence of words that are unstructured (e.g., may not be in sentence form and contain no punctuation marks).

Based on the transcription and the spontaneous nature of spoken language, the text string likely contains errors or is incomplete. The errors may include, for example, incorrect words, filler words, false starts to words, incomplete phrases, muted or indistinguishable words, or a combination thereof, that make the text string unreadable or difficult to understand by a human or computer.

In one embodiment, the text string may be received directly from the ASR system 206. In another embodiment, the text string may be received from a repository, database, or computer file that contains the text string. For example, in one embodiment, the text string may be generated by the ASR and saved to a repository, database, or computer file, such as a .txt file or Microsoft Word™ file, as examples, for subsequent retrieval. In either case (ASR vs file), the optional auto-punctuator 208, semantic cue detector 210 and/or key phrase cue detector 214 receive an ASR output.

In one embodiment, the text string may be converted from text or character format into a numerical format. In one embodiment, the conversion may be performed by converting each word of the text string into one or more tokens by a semantic analyzer 306 (see FIG. 3). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (e.g., contextualized word embeddings) of each of the tokens into a vector representation. The contextualized vectors are generated through the processes and methods used in language models such as the BERT (Bidirectional Encoder Representations from Transformers) and RoBERTa (Robustly Optimized BERT Pretraining Approach) language models. For the purposes of discussion throughout this application, it is assumed that the contextualized vectors are generated based on such processes and methods.

Continuing with the example, the one or more tokens may be generated based on a variety of criteria or schemes that may be used to convert characters or text to numerical values. For example, in one embodiment, each word of a text string can be mapped to a vector of real values. The word may then be converted to one or more tokens based on a mapping of the word via a tokenization process. Tokenization processes are known in the art and will not be further discussed in detail here.

In one embodiment, the formatted text string may further be transmitted for display or may be transmitted to a repository, database, or computer file, such as a .txt file or Microsoft Word™ file, as examples, to be saved for further retrieval by a user or components of the system 200.

Prosodic Cue Detector 210 is a speech classifier to evaluate an interactive communication (incoming call) between a first participant and a second participant to obtain one or more inferred changes to emotion of speech 205 of the first participant. As later described in FIG. 4, machine learning engine 402 trains a prosodic cue model 426 to detect when a customer's emotions are changing. One or more inferred changes to emotion of the speech may be based at least on prosodic cues within the interactive communication. The prosodic cues may comprise any of: frequency changes, pitch, pauses, length of sounds, volume (e.g., loudness), speech rate, voice quality or stress placed on a specific utterance of the speech of the first participant and/or second participant.

Semantic Cue Detector 212 is a semantic classifier to evaluate an interactive communication (incoming call) between a first participant and a second participant to obtain one or more inferred detected sentiments. While text semantics may be analyzed to determine sentiments, alternatively, or in addition to, speech cues may also be analyzed to determine semantics that may capture or enhance an understanding of the sentiments of the caller. Therefore, semantic cue detector 212 receives as inputs, text (e.g., transcript) of the call as well as speech cues from prosodic cue detector 210. For example, a person who is shouting (i.e., prosodic cue) may add context to semantics of a discussion found in the transcript text. Using acoustic features in accordance with aspect-based sentiment analysis is a more targeted approach to sentiment analysis, identifying both emotion and their objects (products, services, etc.). Therefore, the inferred sentiments of the speech of a participant may be based at least partially on semantic cues within the interactive communication (e.g., call). As later described in FIG. 4, machine learning engine 402 trains a sentiment predictive model 430 to detect when a customer's emotional state is changing (e.g., they are becoming angry or dissatisfied).

Semantic Cue Detector 212 may also include trend or feedback scoring based on a trend of accumulated sentiment scores. A sentiment score may reflect a customer's satisfaction level (gauge) and an average, over a period of time of a customer's emotions, may be predicted for each utterance. Semantic Cue Detector 212 may analyze the segments to determine, based on sentiments of the call and the language choice of customer during the call, whether an emotion is being voiced. Semantic Cue Detector 212 may classify a detected sentiment based on any of: emotions detected, subject matter detected, sound volume, or intensity of the call utterances. For example, based on prosodic cues from Prosodic Cue Detector 210, the semantic detector may detect an agitated caller who may raise their voice, increase the speed or intensity of their speech, or use words depicting anger. Therefore, the technology described herein improves the technology associated with handling calls by, at a minimum, properly capturing caller sentiment and subsequently detected sentiment trends. Properly captured sentiment, as described herein, is one element leading to higher correlated solutions.

In one embodiment, the sentiment score may measure a customers' likelihood to recommend a product or service. A transformer-based language model uses call transcripts to predict customers' answer to the following question: "Based on your recent call experience, if a family member, friend, or colleague asked you to recommend a credit card, how likely would you be to recommend [company name]?" The response is on a scale of 1-5 and delineated as follows: "promoters" respond 5, "neutral" respond 4, "detractors" respond 3 or less. One way to calculate sentiment score is by taking the percent of "promoters" and subtracting the percent of "detractors," and this particular method of calculation is also commonly named the "Net Promoter Score." The model architecture consists of an input of tokenized word indices, each represented by an embedding vector. The input, an entire call transcript, is vectorized and then transformed via layers of "self-attention" which produce a feature-rich vector representation of the transcript. This vector representation is then passed into a classification layer, which utilizes an ordinal regression algorithm to rank the output as "detractor"<"neutral"<"promoter". The rank of "promoter" represents a predicted score greater than "detractor" and "neutral" ("neutral" predicted as greater than "detractor" but less than "promoter", etc.) A predicted sentiment score is then calculated as above with these predicted labels.

A trend can be calculated aggregating the model-predicted sentiment scores on a daily, weekly, or monthly basis to obtain sentiment scores over time. With this time-series, deviations can be determined by applying a trend detection algorithm measuring changes in the mean and/or slope. In addition, a customer-specific trend score may be calculated by tracking sentiment scores for a customer across calls. For example, the Semantic Cue Detector 212 may predict trend scores for all customer X's previous calls to obtain X's time-series. The system may monitor these trend scores to detect when a deviation occurs, such as a very negative call, or calculate the moving average to determine when a customer's experience drops below a threshold. Calls can be identified for further investigation of coaching opportunities and improvement to call center processes.

Therefore, the technology described herein solves one or more technical problems that exist in the realm of online computer systems. One problem, proper identification of a caller's sentiment in textual transcriptions, prevents other systems from properly correlating sentiment in those textual transcriptions with corresponding caller solutions (based on a correctly identified sentiment). The technology as described herein provides an improvement in properly identifying a caller's sentiment using a real-time transcription and sentiment trend that increases a likelihood of a correlation with a real-time solution (e.g., in the automated system assistance) and subsequent successful outcome of the call. Therefore, one or more solutions described herein are necessarily rooted in computer technology in order to overcome the problem specifically arising in the realm of computer networks. The technology described herein reduces or eliminates this problem of an inability for a computer to properly capture a correct sentiment understanding or sentiment trend as will be described in the various embodiments of FIGS. 1-8.

For real-time trends, the model can predict continuously as the call is transcribed. This generates a real-time trend score that updates as the call progresses. A trend may be detected when the real-time score deteriorates significantly. When a downward trend is detected, it should be remedied at that time.

Key Phrase Cue Detector 214 may be a text classifier to evaluate the interactive communication between a first participant and a second participant to obtain one or more key phrases in the speech of the first participant. Key phrases may indicate the topic(s) within a dialogue. In addition, they may be semantically rich and easy to comprehend as they may typically be short (e.g., 1-2 word phrases). These short phrases may be useful for determining the intent of calls both manually and automatically. The one or more key phrases of the speech may be based at least partially on linguistic cues within the interactive communication.

In some embodiments, Key Phrase Cue Detector 214 utilizes a term frequency—inverse document frequency (tf-idf) approach to look at the frequencies of words/phrases on a given call. In information retrieval, tf-idf is a numerical statistic that is intended to reflect how important a word is to a document in a collection or corpus. It is often used as a weighting factor in searches of information retrieval, text mining, and user modeling. The tf-idf value increases proportionally to the number of times a word appears in the document and is offset by the number of documents in the corpus that contains the word, which helps to adjust for the fact that some words appear more frequently in general. Tf-idf can be successfully used for stop-words filtering in various subject fields, including text summarization and classification. For example, if a certain phrase is rare in most of the other calls, but more frequent in the current call, then it is selected as a key phrase for this call.

In some embodiments, the key phrases are extracted in an unsupervised manner and therefore do not become outdated, as they may be updated as new calls come in. Therefore, even when word choices differ through time, the key phrase detector (e.g., extractor) is able to keep up with the new trends (e.g., new phrasing or new subjects).

The key phrases are generally indicative of call reasons and may have a correlation with how much effort the customer needs to make to resolve their issue. For example, the customers calling about their cards not working generally end up requesting a new card. Therefore, classifiers would benefit from these key phrases as features. In addition, offering a new card with fast shipping without expecting the customer to inquire about it can result in low effort from the customer's perspective, which may be useful information for predicting an effort level in the call.

Figure 4:
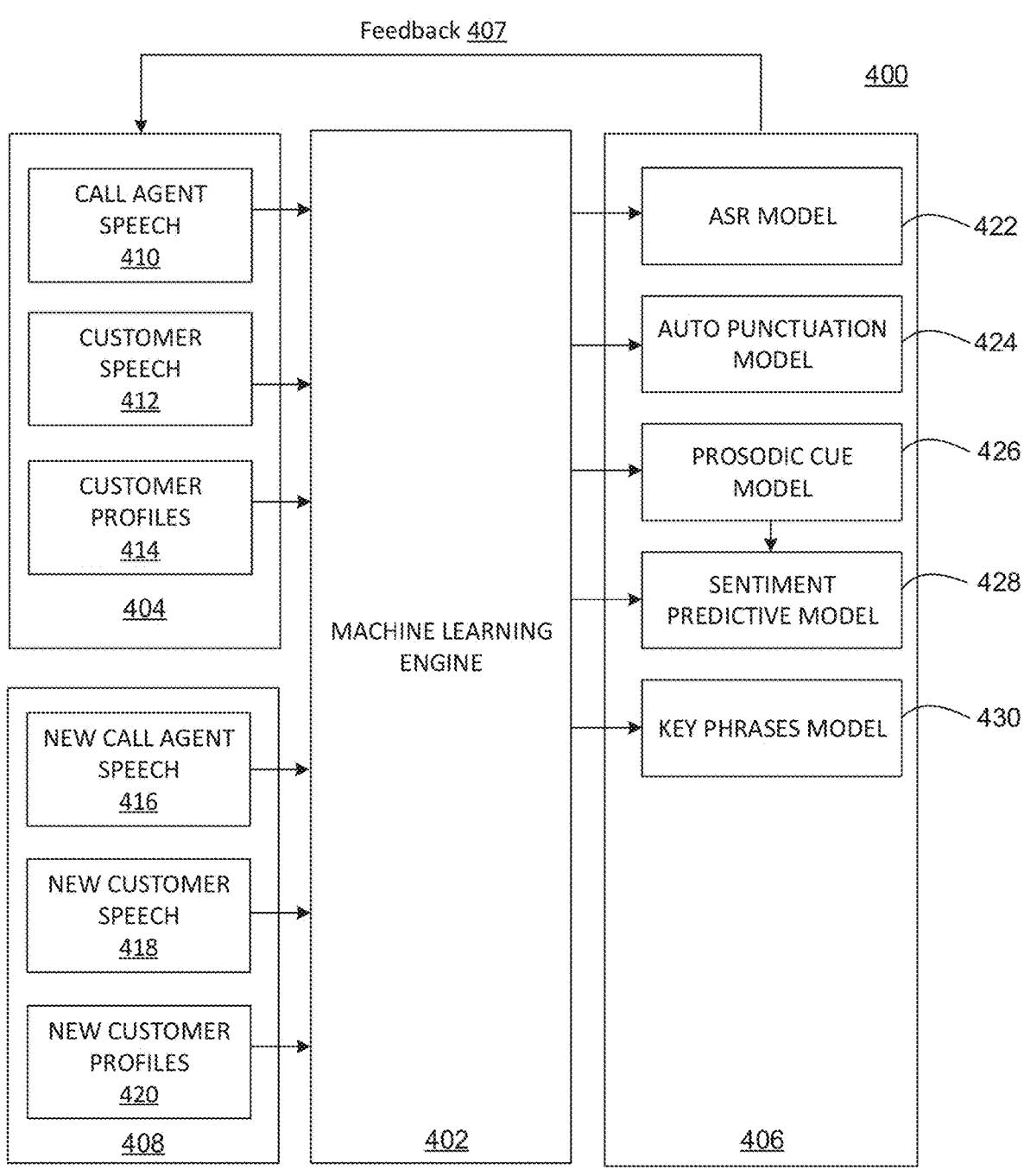
FIG. 4 is a block diagram for processing an incoming call with machine learning, according to some embodiments.

After collecting data points regarding the customer and call as previously described above, such as the customer's emotional state and their reason for calling, the system may, in some embodiments, aggregate this information into, for example, a single unit of analysis, to generate a customer profile 414 (see FIG. 4). The customer profile may contain both metadata related to the customer, collected in an offline manner, as well as information collected by the various ML models 406, which may be iteratively updated as the call proceeds. A customer profile may contain a mix of data types. For example, all data types are vectorized and then concatenated to form a single fixed-length vector.

Summarizer 216 extracts words, phrases and/or numbers from the transcript of the incoming call (dialog between the caller and the call agent). These words and phrases may be preselected from known subjects or themes (credit card, payments, interest rates, loans, lost cards, etc.) and augmented with key phrases from key phrase cue detector 214. In one non-limiting example, the system may also incorporate ontology-based information into vectors. This involves extracting, for example, 15 phrases from transcripts and resolving these to concepts for a customer. Ontology uses an entity-linking model. For example, given the phrase "chip in my card isn't working" in Customer Profile x and the phrase "chip has scuff marks" in Customer Profile y, an entity-linking model resolves these to the concept "card_broken." This concept may then be embedded in a vector space along with other available data points. One skilled in the art will appreciate that other summarizing approaches may be used or contemplated within the scope of the technology described herein.

While specific examples have been described, any abstractive or generative extractive summarization technique may be substituted without departing from the scope of the technology described herein.

In addition, the extracted words, phrases and key words may map to one or more prosodic cues from prosodic cue detector 210 and sentiments from semantic cue detector 212. The summarizer ranks these key phrases, prosodic cues and sentiments in their associated category based on their importance to the current call. For example, the top n key phrases, top k prosodic cues and top s sentiments are selected. Each n, k, s may be tuned based on a selected threshold within each category. For example, each category will be represented in the summary based on the value of n, k and s; where each component will be selected based on their own individual category thresholds. In a first non-limiting example, a prosodic cue of a customer shouting would be considered very important, while a prosodic cue of pausing may be labeled as less important. In another non-limiting example, a sentiment of anger may be considered very important, while a sentiment of frustration may be labeled as less important.

Summarizer 216 generates a summary of the incoming call based on the extracted words and phrases from the transcript of the incoming call and subsequently highlights words 218 associated with highly ranked prosodic cues, semantic cues and key words cues. These words and phrases are highlighted using known highlighting techniques such as, but not limited to, color highlights, underlining, bold text, italics, all caps, etc. The summation model may also use color codes to gauge customer satisfaction. The highlighted summaries may be provided (i.e., displayed) to the call agent 204 (e.g., in real time) or a manager 220 as call center system feedback.

FIG. 3 is a block diagram of a Natural Language Processor (NLP) system 300, according to some embodiments. The number of components in system 300 is not limited to what is shown and other variations in the number of arrangements of components are possible, consistent with some embodiments disclosed herein. The components of FIG. 3 may be implemented through hardware, software, and/or firmware. As used herein, the term non-recurrent neural networks, which includes transformer networks, may refer to machine learning processes and neural network architectures designed to handle ordered sequences of data for various natural language processing (NLP) tasks. NLP tasks may include, for example, text translation, text summarization, text generation, sentence analysis and completion, determination of punctuation, or similar NLP tasks performed by computers.

As illustrated, system 300 may comprise a Natural Language Processor (NLP) 302. NLP 302 may include any device, mechanism, system, network, and/or compilation of instructions for performing natural language recognition of caller emotions, key phrases and sentiment, consistent with the technology described herein. In the configuration illustrated in FIG. 3, NLP 302 may include an interface 304, a semantic analyzer 306, a Master and Metadata Search (MMDS) 308, an interpreter 310, and/or an actuator 312. In certain embodiments, components 304, 306, 308, 310, and/or 312 may each be implemented via any combination of hardware, software, and/or firmware.

Interface 304 may serve as an entry point or user interface through which one or more utterances, such as spoken words/sentences (speech), may be entered for subsequent recognition using an automatic speech recognition model. While described for spoken words throughout the application, text may also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface 304 may facilitate information exchange among and between NLP 302 and one or more users (callers) and/or systems. Interface 304 may be implemented by one or more software, hardware, and/or firmware components. Interface 304 may include one or more logical components, processes, algorithms, systems, applications, and/or networks. Certain functions embodied by interface 304 may be implemented by, for example, HTML, HTML with JavaScript, C/C++, Java, etc. Interface 304 may include or be coupled to one or more data ports for transmitting and receiving data from one or more components coupled to NLP 302. Interface 304 may include or be coupled to one or more user interfaces (e.g., a speaker, microphone, headset, or GUI).

In certain configurations, interface 304 may interact with one or more applications running on one or more computer systems. Interface 304 may, for example, embed functionality associated with components of NLP 302 into applications running on a computer system. In one example, interface 304 may embed NLP 302 functionality into a Web browser or interactive menu application with which a user (call agent) interacts. For instance, interface 304 may embed GUI elements (e.g., dialog boxes, input fields, textual messages, etc.) associated with NLP 302 functionality in an application with which a user interacts. Details of applications with which interface 304 may interact are discussed in connection with FIGS. 1-9.

In certain embodiments, interface 304 may include, be coupled to, and/or integrate one or more systems and/or applications, such as speech recognition facilities and Text-To-Speech (TTS) engines. Further, interface 304 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface 304 may receive natural language queries (e.g., word, phrases or sentences) from a caller and forward the queries to semantic analyzer 306.

Semantic analyzer 306 may transform natural language queries into semantic tokens. Semantic tokens may include additional information, such as language identifiers, to help provide context or resolve meaning. Semantic analyzer 306 may be implemented by one or more software, hardware, and/or firmware components. Semantic analyzer 306 may include one or more logical components, processes, algorithms, systems, applications, and/or networks. Semantic analyzer 306 may include stemming logic, combinatorial intelligence, and/or logic for combining different tokenizers for different languages. In one configuration, semantic analyzer 306 may receive an ASCII string and output a list of words. Semantic analyzer 306 may transmit generated tokens to MMDS 308 via standard machine-readable formats, such as the eXtensible Markup Language (XML).

MMDS 308 may be configured to retrieve information using tokens received from semantic analyzer 306. MMDS 308 may be implemented by one or more software, hardware, and/or firmware components. MMDS 308 may include one or more logical components, processes, algorithms, systems, applications, and/or networks. In one configuration, MMDS 308 may include an API, a searching framework, one or more applications, and one or more search engines.

MMDS 308 may include an API, which facilitates requests to one or more operating systems and/or applications included in or coupled to MMDS 308. For example, the API may facilitate interaction between MMDS 308 and one or more structured data archives (e.g., knowledge base).

In certain embodiments, MMDS 308 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 308 may initialize the data index, perform delta indexing, collect metadata, collect master data, and administer indexing. Such a searching framework may be included in one or more business intelligence applications (e.g., helpdesk, chatbots, voice interactive components, etc.).

In certain configurations, MMDS 308 may include or be coupled to a low level semantic analyzer, which may be embodied by one or more software, hardware, and/or firmware components. The semantic analyzer may include components for receiving tokens from semantic analyzer 306 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS 308 may leverage various components and searching techniques/algorithms to search the data index using tokens received by semantic analyzer 306. MMDS 308 may leverage one or more search engines that employ partial/fuzzy matching processes and/or one or more Boolean, federated, or attribute searching components. Although, one skilled in the art will appreciate other approaches to identify these similar elements may be used or contemplated within the scope of the technology described herein.

In certain configurations, MMDS 308 may include and/or leverage one or more information validation processes. In one configuration, MMDS 308 may leverage one or more languages for validating XML information. MMDS 308 may include or be coupled to one or more clients that include business application subsystems.

In certain configurations, MMDS 308 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

In one configuration, MMDS 308 may include one or more machine learning components to enhance searching efficacy as discussed further in association with FIG. 4. In one example, such a learning component may observe and/or log information requested by callers and may build additional and/or prioritized indexes for fast access to frequently requested data. Learning components may exclude frequently requested information from the data index, and such MMDS data may be forwarded to and/or included in interpreter 310.

MMDS 308 may output to interpreter 310 a series of Meta and/or master data technical addresses, associated field names, and any associated description fields. MMDS 308 may also output matching scores to interpreter 310.

Interpreter 310 may process and analyze results returned by MMDS 308. Interpreter 310 may be implemented by one or more software, hardware, and/or firmware components. Interpreter 310 may include one or more logical components, processes, algorithms, systems, applications, and/or networks. In one example, interpreter 310 may include an agent network, in which agents make claims by matching policy conditions against tokenized natural language queries and context information.

Consistent with embodiments of the present invention, interpreter 310 may be configured to recognize information identified by MMDS 308. For example, interpreter 310 may identify ambiguities, input deficiencies, imperfect conceptual matches, and compound commands. In certain configurations, interpreter 310 may initiate, configure, and manage user dialogs; specify and manage configurable policies; perform context awareness processes; maintain context information; personalize policies and perform context switches; and perform learning processes.

Interpreter 310 may provide one or more winning combinations of data elements to actuator 312. Interpreter 310 may filter information identified by MMDS 308 in order to extract information that is actually relevant to spoken inputs. That is, interpreter 310 may distill information identified by MMDS 308 down to information that is relevant to the words/sentences and in accordance with intent. Information provided by interpreter 310 (e.g., winning combination of elements) may include function calls, metadata, and/or master data. In certain embodiments, the winning combination of elements may be arranged in specific sequence to ensure proper actuation. Further, appropriate relationships and dependencies among and between various elements of the winning combinations may be preserved/maintained. For example, Meta and master data elements included in a winning combination may be used to populate one or more function calls included in that winning combination.

Actuator 312 may process interpreted information provided by interpreter 310. Actuator 312 may be implemented by one or more software, hardware, and/or firmware components. Actuator 312 may include one or more logical components, processes, algorithms, systems, applications, and/or networks. Actuator 312 may be configurable to interact with one or more system environments.

Consistent with embodiments of the present invention, actuator 312 may be configured to provide information to one or more users/systems (e.g., auto-speech recognizer 206 as shown in FIG. 2). In such embodiments, actuator 312 may interact with one or more information display devices.

In certain embodiments, actuator 312 may be configured to send requests to one or more devices and/or systems using, for example, various APIs. Actuator 312 may generate one or more presentations based on responses to such commands.

For clarity of explanation, interface 304, semantic analyzer 306, MMDS 308, interpreter 310, and actuator 312 are described as discrete functional elements within NLP 302. However, it should be understood that the functionality of these elements and components may overlap and/or may exist in fewer elements and components. Moreover, all or part of the functionality of these elements may co-exist or be distributed among several geographically-dispersed locations.

FIG. 4 is a block diagram of a machine learning system, according to some embodiments. A machine learning system 400 may include a machine learning engine 402 of one or more servers (cloud or local) processing audio text (speech), such as words, phrases or sentences, to recognize relationships of words (e.g., within sentences) received by natural language system 200. As described in various embodiments, machine learning engine 402 may be used to recognize speech, speech cadence, pitch, pauses, volume, speech rate or stress, recognize punctuation, recognize sentiment within a customer's speech, recognize trends, recognize key phrases, and provide relevant highlighting to provide assistance to a call agent or other ML models/systems. While described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 402 may use various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns and associated emotions within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of word recognition, a dataset of audio/word matches may be used.

In a first training stage, training data set 404 (e.g., call agent speech 410, customer speech data 412, customer profiles 414, etc.) may be ingested to train various ML models 406. Customer profiles may not change from model to model, but each model 406 can select what parts of the profile are more important for the class value they are training to predict (e.g., weighting certain parts more/less relative to the other parts).

In a non-limiting example, a customer's customer profile 414 may include data points such as sentiment, emotion, and trend/feedback score, call reasons, links with other customers with similar call reasons, workflows associated with the customer, or recommendations to the agent.

Training a model means learning (determining) values for weights as well as inherent bias from labeled examples. In supervised learning, a machine learning algorithm builds a model by examining many examples and attempting to find a model that minimizes loss; this process is called empirical risk minimization. A language model assigns a probability of a next word occurring in a sequence of words. A conditional language model is a generalization of this idea: it assigns probabilities to a sequence of words given some conditioning context.

In a first case example, an ASR machine learning model 422 may be trained on, for example, hundreds/thousands of hours of call recordings with manual transcriptions, and may be implemented with actively developed open source speech recognition toolkits. The features to the model may include Mel-Frequency Cepstrum Coefficients (MFCCs), which represent the energy present at various frequency ranges, with ranges chosen to mimic human auditory response. The underlying model methodology leverages a combination of GMMHMM (Gaussian mixture modeling and hidden Markov modeling), n-gram language modeling, and deep neural networks (DNN). The model may achieve a word error rate (WER) of ~15.0%. This is equivalent to inter-transcriber discrepancy by a professional transcriber and thus represents a natural limit for the system (given that labels are produced by these various transcribers). However, lower error rates may be achieved by continuous training and fine-tuning of the model.

All models 406, except the prosodic cue model 426, use an output of the ASR model 422 as they operate on the written text/transcription level. In addition, they are all supervised except for the key phrase model which uses tf-idf (heuristic), as previously described.

In a second case example, an optional automated punctuation model 424 may be a machine learning model (e.g., deep neural) that performs multi-class classification over possible punctuation marks between words in unpunctuated text. The network uses a deep fully connected bi-directional transformer-based pre-trained neural network language model (LM) as the core of the automatic text punctuation network. The network adds several additional layers after the pre-trained LM network with each layer preserving the fully connected nature of the entire network. Each additional layer is trained from scratch before fine-tuning parameters of the entire network. The prediction of what punctuation to place after each word (including choosing no punctuation) is performed in parallel during both training and inference, which is a departure from most previous approaches for the punctuation task. Although prediction is performed in parallel, the system replicates the data to see the same number of inputs during training as a sequential prediction network. Furthermore, at inference time the model aggregates predictions across multiple context windows allowing greater context to be used in predicting a word's punctuation and providing robustness through an ensemble of multiple predictions.

In one embodiment, once the model is trained, the aforementioned processes may be performed by successively repeating the processes for one or more text strings of a larger text string, where the one or more text strings contain one or more overlapping windows of text. By performing these processes on overlapping windows of text, the optional auto-punctuator 208 can more accurately determine the punctuation mark for each word in a text string, because the overlapping windows of text allow auto-punctuator 208 to determine the context for each word of the text string by looking at the words before and after the word in relation to multiple combinations of words in the text string such that the auto-punctuator 208 can determine how the word is used in the text string (i.e., context).

In a third case example, a prosodic cue model 426 may be trained based on machine learning engine 402 processing training data set 404. In this case, the prosodic cue model 426 is trained to recognize speech frequency changes, pitch, pauses, length of sounds, volume (e.g., loudness), speech rate, voice quality or stress placed on a specific utterance of the speech of the first participant and/or second participant in an interactive communication (e.g., call).

Figure 6:
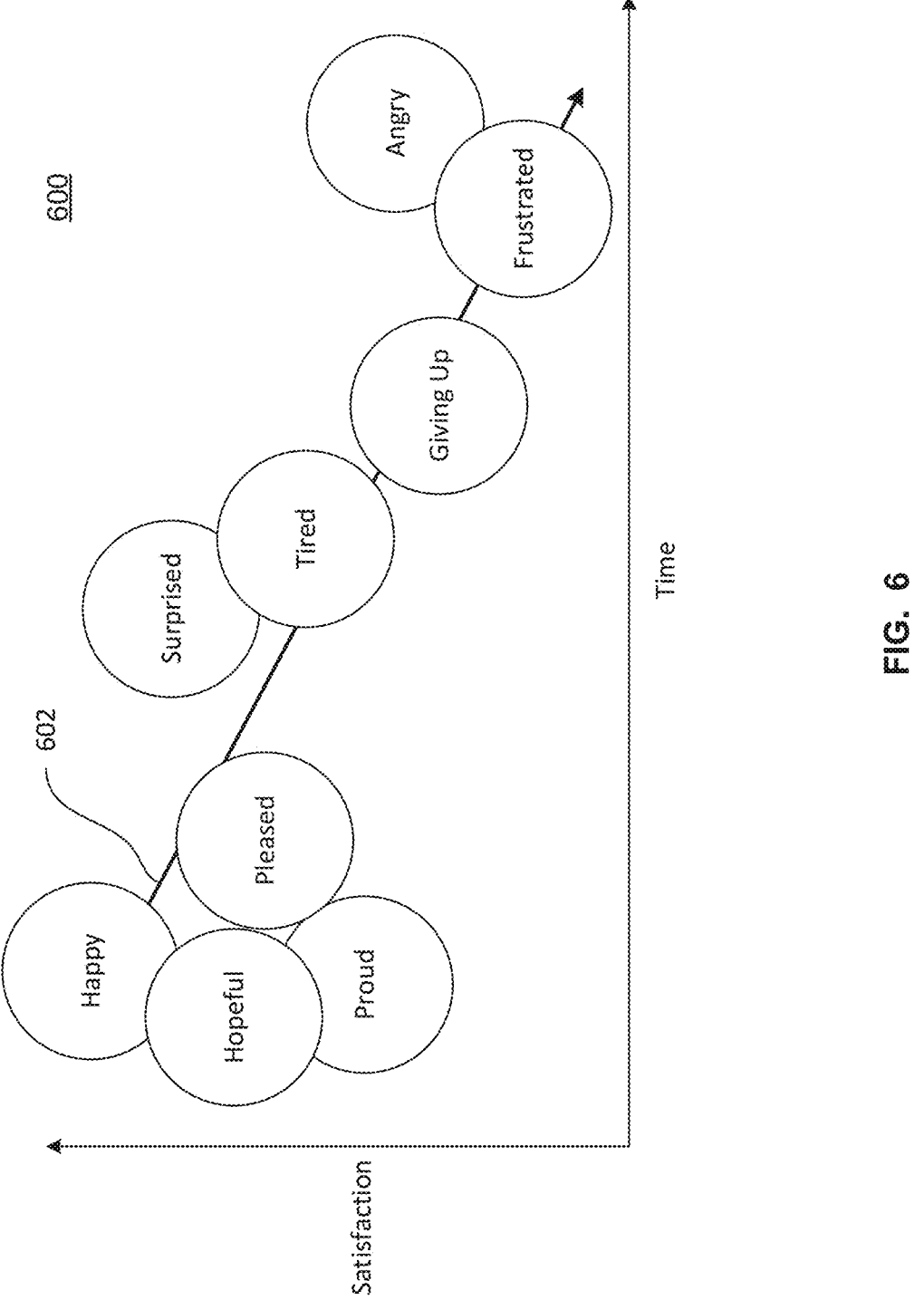
FIG. 6 illustrates a graph of groupings of caller emotions, as per some embodiments.

In a fourth case example, a sentiment predictive model 428 may be trained based on machine learning engine 402 processing training data set 404 as well as prosodic cues extracted from the speech input training data (410 and/or 412) by prosodic cue model 426. In this case, the sentiment predictive model 428 is trained to recognize sentiments within speech or a transcript of speech. For example, sentiment predictive model 428 may detect when a customer is becoming angry or dissatisfied. Acoustic features (from prosodic cue model 426) in accordance with aspect-based sentiment analysis is a more targeted approach to sentiment analysis identifying both emotion and their objects (products, services, etc.). This is particularly useful for customer calls as it helps agents identify which items need improvement to achieve higher customer satisfaction. The system performs aspect-based sentiment classification on a turn level (e.g., every time a new utterance is available). Performing this in real-time enables the system to track how sentiment changes over the course of a call. The sentiment analyzer is a classifier that may take in utterance text and provides an output label indicating an utterance's sentiment and aspect. In this context, aspect refers to the service/product that the customer shows emotion toward. For example, customers might be generally happy about being a customer of a bank, but they might complain about their interest rates. In this case, the aspect would be toward interest rates (e.g., the service/product the customer is referring to) and the sentiment would be negative. One goal may be to detect when conversation is headed in a direction containing disappointment, dissatisfaction, as recognized by emotions trending from happy to tired, giving up, frustrated or angry (FIG. 6). By way of a non-limiting example, customer dissatisfaction may be determined by one of two ways—the detected emotion belongs to a negative category (e.g., angry) and the call's emotions have a downward trajectory (e.g., initial emotions were positive and subsequent emotions are intermediate).

The interaction below is an example where the sentiment against a certain aspect changes.

[Agent] I would be happy to help you with viewing your payment history.

[Customer] Awesome. I hope I can get the app to work.

Aspect: app

Sentiment: positive

[Agent] Once in the account summary page, please click on the account history to view previous transactions.

[Customer] This is useless. There is no way that this app can go back 6 months and show all the history at the same time.

Aspect: app

Sentiment: negative

As can be seen in the interaction above, the sentiment against the app has changed over the course of the call. The sentiment predictive model's turn level analysis may also capture that the agent's instructions did not resolve the customer's issue.

This component is to not only capture sentiments for specific aspects, but also to understand a customers' emotions throughout a call. To that end, sentiments are not limited, for example, to a specific number of positive/negative sentiments: a range of emotions that affect customer satisfaction considered during classification. The example below shows a change of emotions during a call.

[Customer] I have been trying to make a payment for over an hour now and it's still stuck!

Sentiment: angry

[Agent] I apologize for the inconvenience. I will be happy to assist you with your payment.

[Customer] Oh good. Finally, I'm talking to someone who can help.

Sentiment: hopeful

[Customer] Ah, I see. There it is. That payment button seemed to be hiding on my phone screen. Now that I found it, it'll be easier.

Sentiment: happy

In a fifth case example, a key phrase model 430 may be trained based on machine learning engine 402 processing training data set 404. In this case, the key phrase model 430 is trained to recognize key phrases within speech or a transcript of speech. In one non-limiting example, key phrase extraction may be unsupervised and may utilize any known key phrase extraction technique, such as BERT based techniques.

In a second stage, the training cycle continuously looks at results, measures accuracy and fine-tunes the inputs to the modeling engine (feedback loop 407) to improve capabilities of the various ML models 406.

In addition, as various ML models (algorithms) 406 are created, they are stored in a database (not shown). For example, as the training sets are processed through the machine learning engine 402, the ML models 406 may change (tuning/fine tuning) and therefore may be recorded/ updated in the database.

Future new data 408 (e.g., new call agent speech 416, new customer speech 418 or customer profiles 420) may be subsequently evaluated with the trained ML models 406.

The system is a framework that unites several components to better understand customers and help call center agents converse with customers to achieve higher customer satisfaction. The system detects when customers become or are soon to be frustrated and provides support to agents in real time to improve the customer experience. An example system architecture embodiment is illustrated in FIG. 4.

Figure 5:
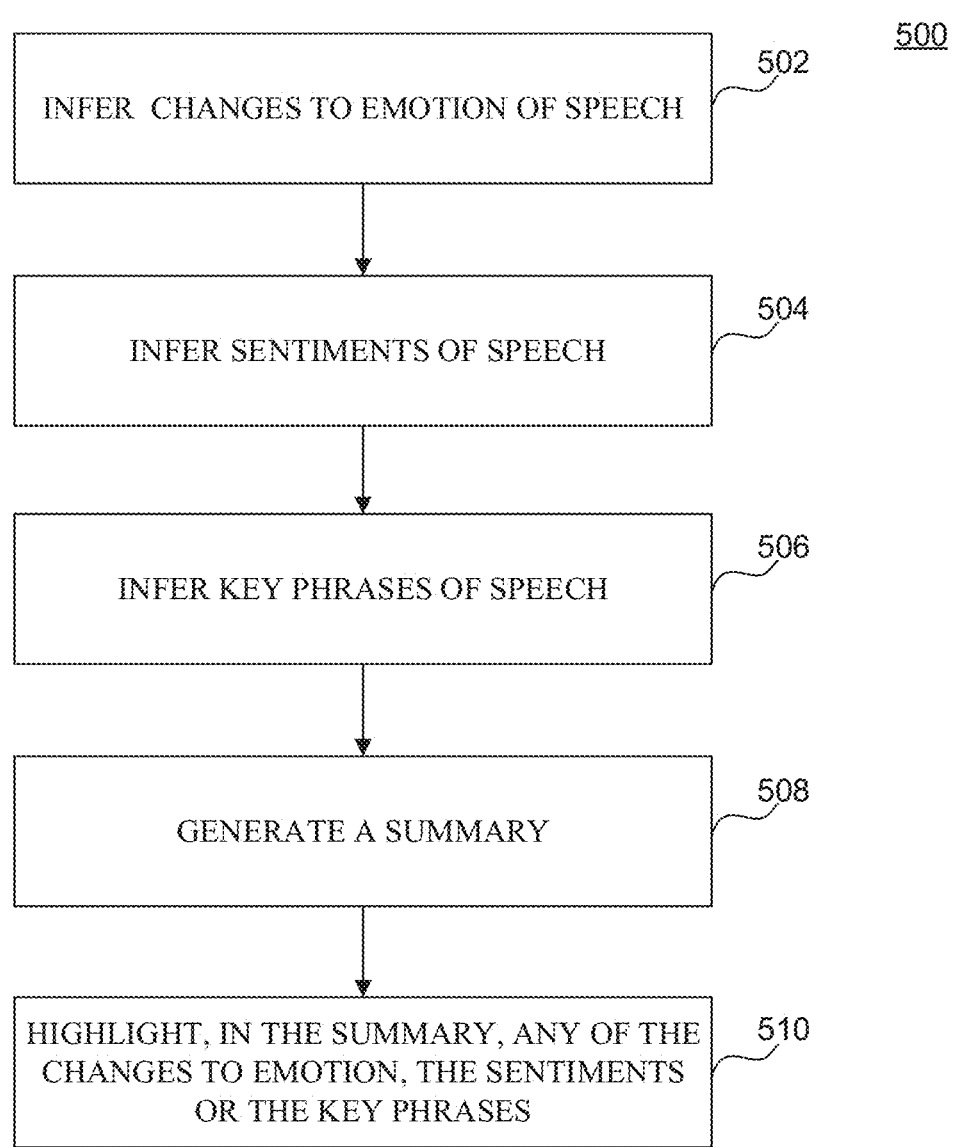
FIG. 5 is a flow diagram for extracting cues from an interactive communication, according to some embodiments.

FIG. 5 is a flow diagram for real-time call processing, according to some embodiments. In 502, a prosodic classifier (e.g., prosodic cue machine learning model) may be configured to extract and evaluate speech of an interactive communication (incoming call) between a first participant and a second participant to infer one or more changes to emotion of the speech of the first participant. The one or more changes to emotion of the speech may be based at least on extracted prosodic cues found within the interactive communication. The prosodic cues may comprise any of: frequency changes, pitch, pauses, length of sounds, volume (e.g., loudness), speech rate, voice quality or stress placed on a specific utterance of the speech of the first participant and/or second participant.

In 504, a sentiment classifier (e.g., sentiment predictive machine learning model) is configured to infer/classify the incoming call based on detected sentiments. A machine learning engine 402 trains a sentiment predictive model 428 to detect when a customer's emotions are changing, for example, if they are becoming angry or dissatisfied. The sentiment classifier uses a combination of speech and textual cues to detect the sentiments. For example, acoustic features (e.g., prosodic cues) provide an aspect-based sentiment analysis by identifying both emotional changes (from the prosodic cue detector) and semantic cues from text of the interactive communication. The system will convert the speech to text using, for example, the automatic speech recognizer machine learning model 422. Therefore, the inferred sentiments of the speech of the first participant may be based used at least partially in conjunction with semantic cues within text of the interactive communication. For example, the utterance "not sure how that might work but I can try" has a discouraged tone sentiment. However, without the semantic cues, it might appear hopeful. Instead, with negative sematic cues, the state may be closer to the caller giving up than being hopeful.

Call center system 400 may map extracted call features to detected sentiments. For example, the machine learning engine 402 classifies a sentiment of customer speech and, if a negative sentiment is detected, identifies a negative emotion (anger, confusion, discontent, or dissatisfaction) present. The system may then extract services, features, and topics mentioned by customers and may identify one or more categories of sentiment attributed to each of these. The system may classify emotions detected, subject matter detected, sound volume or intensity of the call utterances. For example, using extracted prosodic cues from 502, an agitated caller may raise their voice, increase the speed or intensity of their speech or use words depicting anger. The informative information may be utterances with low sentiment scores that come right before utterances with high sentiment scores. Those utterances will be positive examples.

The system performs aspect-based sentiment classification on a turn level (e.g., every time a new utterance is available). Performing this in real-time enables the system to track how sentiment changes (e.g., trends) over the course of a call.

In 506, a text classifier (e.g., key phrase machine learning model) is configured to evaluate the interactive communication between a first participant and a second participant to extract one or more key phrases of the speech of the first participant. The one or more key phrases of the speech may be based at least partially on linguistic cues within the interactive communication. In one non-limiting example, key phrase extraction may be unsupervised and may utilize any approach known key phrase extraction technique, such as BERT based techniques.

In 508, a summarizer is configured to generate a summary of the interactive communication between a first participant and a second participant. As previously described, an abstractive or generative extraction technique may be used for the summary of the interactive communication.

In 510, the summarizer highlights, in the summary, any of the changes to emotion, the sentiments or the key phrases. The highlights may include any of: a highlight for any of the changes to emotion, a highlight for any of the sentiments, or a highlight for the key phrases. In some embodiments, the changes to emotion highlight, the sentiment highlight and the key phrases highlight may occur for different content. In some embodiments, two or more of the changes to emotion highlight, the sentiment highlight and the key phrases highlight may occur for common content.

FIG. 6 illustrates a graph of groupings of emotions 600, as per some embodiments. The sentiment predictive model 428 may use the various emotions detected to recognize trends in emotions. As shown, a downward (negative) trend 602 of emotions may lead to a bad customer experience. Satisfactions such as happy, hopeful, proud, pleased may be recognized as positive emotional states. However, over time, these emotions may become less positive. Emotions such as surprised and tired may ultimately cascade quickly downward to highly negative emotions such as giving up, frustrated and ultimately anger. The technology disclosed herein detects these various emotions as well as providing real-time call agent assistance in attempt to stem and reverse this negative emotional movement over time and resolve the pertinent issues quickly and effectively.

FIG. 7 is an example of highlighted hidden cues within an interactive communication, according to some embodiments. While highlighting has been shown using known highlighting techniques such as underlining, italicized text or all caps, any other known highlighting technique may be implemented without departing from the scope of the technology disclosed herein. In one non-limiting example, anger may be reflected with red highlighting of lettering for words detected as spoken in anger (emotion).

A summary of a conversation 700 (e.g., incoming call) has been generated by the summarizer 216. The summary may include a varying level of detail. For example, in some embodiments, the summary may include all of the words spoken by the customer (caller) and the call agent (agent). In some embodiments, the summary may include fewer than all of the words spoken by the customer (caller) and the call agent (agent). In some embodiments, the summary may include only key phrases spoken by the customer (caller) and the call agent (agent). In some embodiments, the summary may include only words derived as extracted cues (prosodic, sentiment and key phrases). Other summary variations are contemplated within the scope of the technology described herein. In each level of detail, one or more extracted cues are highlighted for a quick reading, for example, to get up to speed on a subsequent call by the same caller. As shown in the example below, when multiple extracted cues occur for the same word or phrase, these words or phrases may have multiple highlighting. As shown, the following words/phrases have been (highlighted):

Prosodic cues (704 and 706): pitch increase (italicize)—so give me let me let me let me speak to a manager please, I never pay I never paid I had it for ten years never paid Sentiment (708): anger (all CAPS)—NEVER PAID (708)

Key phrases (underlined) 702—fee, annual fee, membership fee

Figure 8:
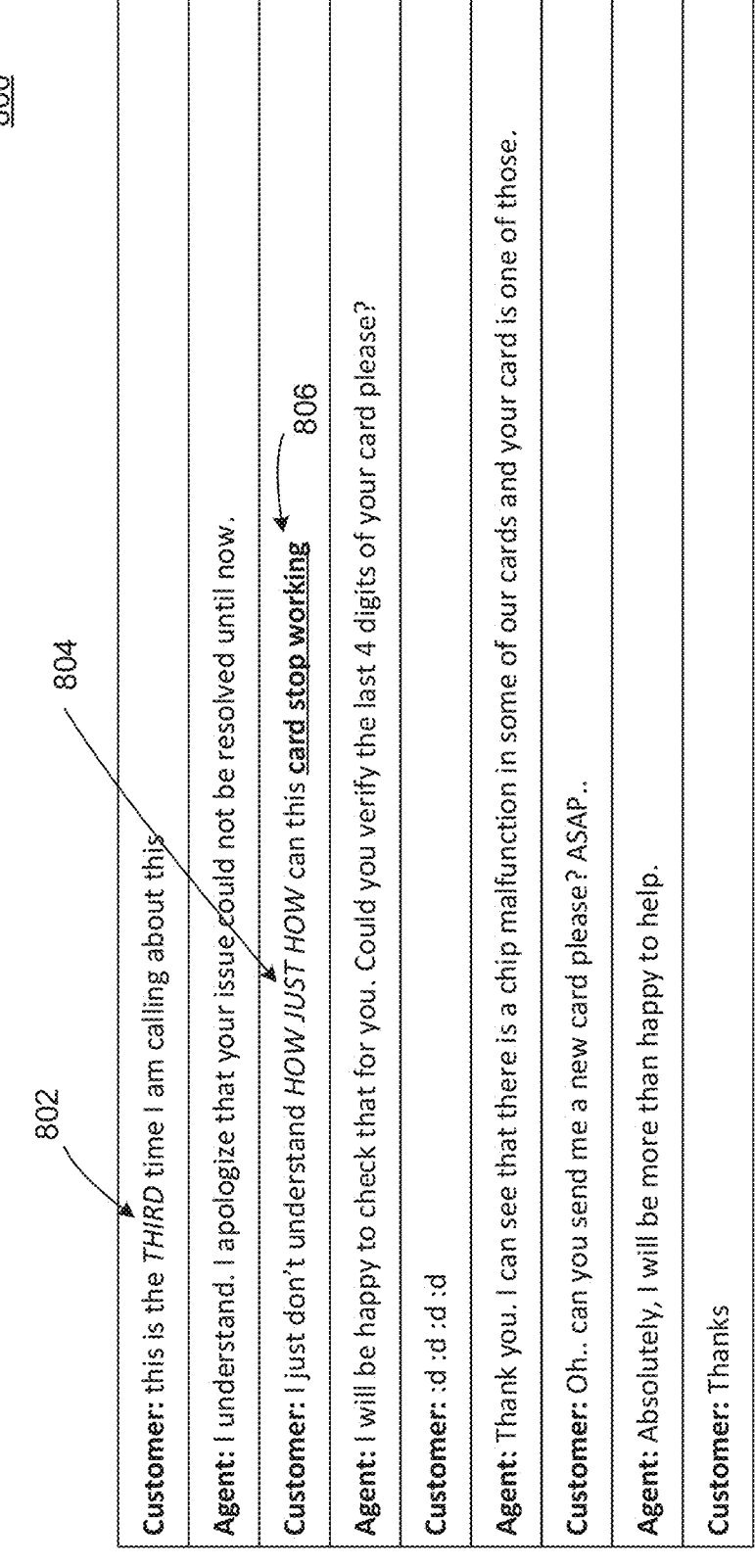
FIG. 8 is another example of highlighted extracted cues within an interactive communication, according to some embodiments.

FIG. 8 is another example of highlighted hidden cues within an interactive communication, according to some embodiments. In this embodiment, the summary may include fewer than all of the words spoken by the customer (caller) and the call agent (agent). As the example below shows, it is much easier to browse through the content of the transcription with the extracted cues visualized. Just by looking at the highlighted words ('THIRD' and 'HOW JUST HOW') and the underlined words ('card stop working'), it is possible to understand that the customer is having a problem with their credit card, which used to work, and they have called multiple times to resolve this problem. The sentiment is also shown in the above example with highlighted words. 'HOW JUST HOW' makes it easy to understand that the customer is not only asking for a resolution but also requesting an explanation and they are frustrated. Seeing the 'card stop working' phrase, it would be faster for managers to catch up with the topic of the conversation without needing to listen/read through the entire call. The following words/phrases have been (highlighted):

Prosodic cues (italicized) 802 and 804—third, how just how

Sentiment: anger (all CAPS) 802 and 804—THIRD, HOW JUST HOW

Key phrases (underlined)—card stopped working

The extracted cues presented in this disclosure are intended to be used by at least two different downstream users (agent/managers and ML models). One benefit of visualizing the hidden cues to call agents/managers is to facilitate their work (e.g., regulatory compliance, training opportunities, etc.) and save time. Another benefit is utilizing these cues as features for downstream ML models to increase a model's effectiveness in understanding customer behavior. Utilizing the sentiment of the FIG. 8 example (e.g., frustrated, angry) would help detection of complaints which may be one of many downstream machine learning models in a call center processing pipeline.

Figure 9:
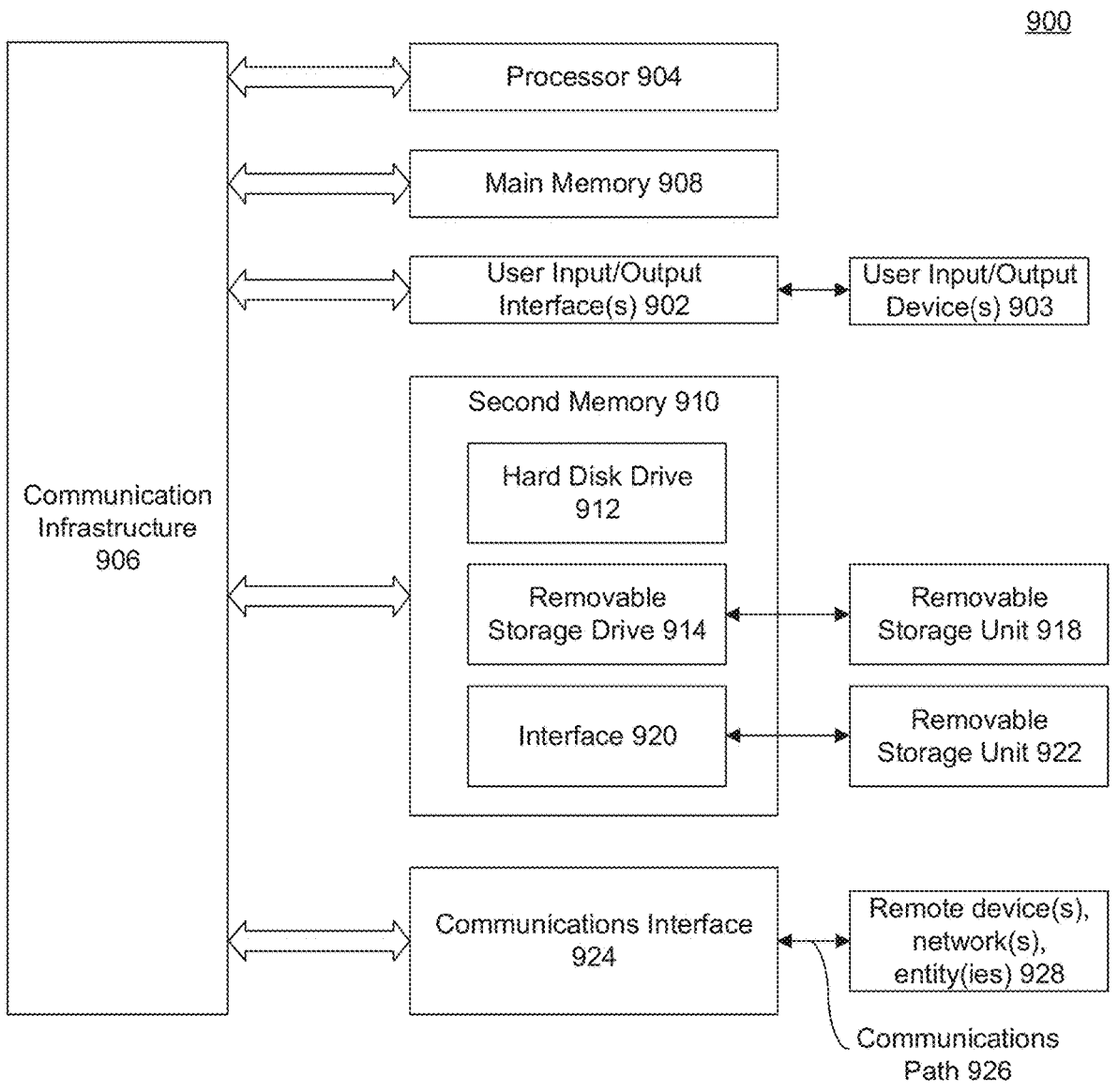
FIG. 9 is an example computer system useful for implementing various embodiments.

Various embodiments can be implemented, for example, using one or more computer systems, such as computer system 900 shown in FIG. 9. Computer system 900 can be used, for example, to implement method 500 of FIG. 5. For example, computer system 900 can extract cues in call center calls. Computer system 900 can be any computer capable of performing the functions described herein. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired, and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for generating an interactive communication summary in a natural language processing environment, the system comprising:

a first machine learning model trained by a machine learning system, wherein the first machine learning model is configured to evaluate prosodic cues within an interactive communication between a first participant and a second participant to infer one or more changes to emotion of speech of the first participant;

a second machine learning model trained by the machine learning system, wherein the second machine learning model is configured to convert the interactive communication into text;

a third machine learning model trained by the machine learning system, wherein the third machine learning model is configured to evaluate, based on the one or more changes to the emotion of the speech of the first participant and the text, semantic cues in the interactive communication to infer one or more sentiments of the speech of the first participant;

a first trend detection algorithm configured to accumulate, in real-time, a plurality of the one or more sentiments to identify a sentiment trend in the interactive communication, wherein the first trend detection algorithm comprises an aspect-based sentiment classification on a turn level for each new utterance, and wherein the aspect comprises a service or product;

a fourth machine learning model trained by the machine learning system, wherein the fourth machine learning model is configured to evaluate the text of the interactive communication to infer one or more key phrases of the speech of the first participant, wherein the fourth machine learning model is trained with key phrases inferred in an unsupervised mode to recognize new phrasing;

a second trend detection algorithm configured, based on the new phrasing, to identify a phrasing trend in the interactive communication, wherein the phrasing trend correlates to a new issue with the service or product by the first participant; and a summarizer configured to:

generate a summary of the interactive communication; and highlight, in the summary, any of the one or more changes to: the emotion of the speech, the one or more sentiments, the sentiment trend, the phrasing trend, or the one or more key phrases.

2. The system of claim 1, wherein the first machine learning model comprises a prosodic cue model to extract and evaluate the prosodic cues within the interactive communication.

3. The system of claim 1, wherein the second machine learning model comprises an automatic speech recognition model to convert the speech of the first participant to the text.

4. The system of claim 1, wherein the third machine learning model comprises a semantic cue model to extract and evaluate the semantic cues within the text.

5. The system of claim 1, wherein the fourth machine learning model comprises a key word model to extract and evaluate key words within the text.

6. The system of claim 1, wherein the prosodic cues comprise any of:

frequency changes, pitch, pauses, length of sounds, volume, loudness, speech rate, voice quality, or stress placed on a specific utterance of the speech of the first participant.

7. The system of claim 1, wherein the one or more changes to the emotion of the speech of the first participant comprises changes to any of: tone, underlying emotions, emotional states, emotional trends, or specific emphasis of the first participant.

8. The system of claim 1, wherein the one or more sentiments of the speech of the first participant are based on any of: vocalized stress on certain words, an increase in volume, an increase in pitch, an inclination towards anger, or inclination towards frustration.

9. The system of claim 1, wherein the one or more key phrases of the speech are based at least partially on linguistic cues within the interactive communication.

10. The system of claim 1, wherein the highlight further comprises:

a first highlight for any of the one or more changes to the emotion of the speech;

a second highlight for any of the one or more sentiments;

a third highlight for any of the one or more key phrases; and wherein the first highlight, the second highlight, and the third highlight differ.

11. The system of claim 1, wherein the fourth machine learning model is further configured to utilize term frequency-inverse document frequency (tf-idf) to determine frequencies of words or phrases within the interactive communication to obtain the new phrasing of the speech of the first participant.

12. A computer-implemented method for processing a call in a natural language environment, comprising:

extracting and evaluating, by a first machine learning model, prosodic cues in an interactive communication between a first participant and a second participant to infer one or more changes to emotion of a speech of the first participant;

converting, by a second machine learning model, the interactive communication to text;

extracting and evaluating, by a third machine learning model and based on the one or more changes and additionally based on the text, semantic cues in the interactive communication to infer one or more sentiments of the speech of the first participant;

accumulating in real-time, by a first trend detection algorithm, a plurality of the one or more sentiments to identify a sentiment trend in the interactive communication, wherein the first trend detection algorithm comprises an aspect-based sentiment classification on a turn level for each new utterance, and wherein the aspect comprises a service or product;

evaluating, by a fourth machine learning model, the text of the interactive communication to extract one or more key phrases of the speech of the first participant, wherein the fourth machine learning model is trained with key phrases inferred in an unsupervised mode to recognize new phrasing;

accumulating, by a second trend detection algorithm, the new phrasing to identify a phrasing trend in the interactive communication, wherein the phrasing trend correlates to a new issue with the service or product by the first participant;

generating a summary of the interactive communication; and highlighting in the summary any of the one or more changes to the emotion of the speech, the one or more sentiments, the sentiment trend, or the one or more key phrases.

13. The method of claim 12, wherein the evaluating the text of the interactive communication further comprises utilizing term frequency-inverse document frequency (tf-idf) to recognize frequencies of words or phrases within the interactive communication to obtain the new phrasing of the speech of the first participant.

14. The method of claim 12, wherein the first machine learning model comprises a prosodic cue model to extract and evaluate the prosodic cues within the interactive communication.

15. The method of claim 12, wherein the second machine learning model comprises an automatic speech recognition model to convert the speech of the first participant to the text.

16. The method of claim 12, wherein the third machine learning model comprises a semantic cue model to extract and evaluate the semantic cues within the text.

17. The method of claim 12, wherein the fourth machine learning model comprises a key word model to extract and evaluate key words within the text.

18. A non-transitory computer-readable medium having instructions stored thereon that, when executed by at least one computing device, cause the at least one computing device to perform natural language operations comprising:

extracting and evaluating, by a first machine learning model, prosodic cues in an interactive communication between a first participant and a second participant to infer one or more changes to emotion of a speech of the first participant;

converting, by a second machine learning model, the interactive communication to text;

extracting and evaluating, by a third machine learning model and based on the one or more changes and additionally based on the text, semantic cues in the interactive communication to infer one or more sentiments of the speech of the first participant;

accumulating in real-time, by a first trend detection algorithm, a plurality of the one or more sentiments to identify a sentiment trend in the interactive communication, wherein the first trend detection algorithm comprises an aspect-based sentiment classification on a turn level for each new utterance, and wherein the aspect comprises a service or product;

evaluating, by a fourth machine learning model, the text of the interactive communication to extract one or more key phrases of the speech of the first participant, wherein the fourth machine learning model is trained with key phrases inferred in an unsupervised mode to recognize new phrasing;

accumulating, by a second trend detection algorithm, the new phrasing to identify a phrasing trend in the interactive communication, wherein the phrasing trend correlates to a new issue with the service or product by the first participant; and generating a summary of the interactive communication; and highlighting in the summary any of the one or more changes to: the emotion of the speech, the one or more sentiments, the sentiment trend, the phrasing trend, or the one or more key phrases.

19. The non-transitory computer-readable device of claim 18, further configured to perform operations comprising:

utilizing term frequency-inverse document frequency (tf-idf) to recognize frequencies of words or phrases within the interactive communication to extract the one or more key phrases new phrasing of the speech of the first participant.

20. The non-transitory computer-readable device of claim 18, wherein the highlighting further comprises:

highlighting by a first highlight the one or more changes to emotion;

highlighting by a second highlight the one or more sentiments;

highlighting by a third highlight the one or more key phrases; and wherein the first highlight, the second highlight, and the third highlight differ.

* * * * *